US012583248B2

(12) United States Patent
Kobayashi

(10) Patent No.: US 12,583,248 B2
(45) Date of Patent: Mar. 24, 2026

(54) DRAWING MATERIAL CONTAINER CARTRIDGE AND DRAWING MATERIAL CONTAINER SET

(71) Applicant: TOKIWA CORPORATION, Gifu (JP)

(72) Inventor: Hironari Kobayashi, Saitama (JP)

(73) Assignee: TOKIWA CORPORATION, Gifu (JP)

( * ) Notice: Subject to any disclaimer, the term of this patent is extended or adjusted under 35 U.S.C. 154(b) by 0 days.

(21) Appl. No.: 18/828,359

(22) Filed: Sep. 9, 2024

(65) Prior Publication Data

US 2025/0100317 A1 Mar. 27, 2025

(30) Foreign Application Priority Data

Sep. 27, 2023 (JP) ................................ 2023-166206

(51) Int. Cl.
*B43K 5/14* (2006.01)

(52) U.S. Cl.
CPC ..................................... *B43K 5/14* (2013.01)

(58) Field of Classification Search
CPC ........ A45D 2040/204; A45D 2040/208; B43K 21/085; B43K 23/08; B43K 23/10
See application file for complete search history.

(56) References Cited

U.S. PATENT DOCUMENTS 5,336,005 A * 8/1994 Moeck .................. A45D 40/20 401/75
6,481,909 B2 * 11/2002 Lee ........................ B43K 24/06 401/116
10,542,813 B2 * 1/2020 Ohba ..................... A45D 40/10

FOREIGN PATENT DOCUMENTS

JP 2000-217635 8/2000

* cited by examiner

*Primary Examiner* — David P Angwin
*Assistant Examiner* — Bradley S Oliver
(74) *Attorney, Agent, or Firm* — Greenblum & Bernstein, P.L.C.

(57) ABSTRACT

A drawing material container cartridge according to one embodiment includes a cartridge body including a tubular portion that accommodates a drawing material, and being configured to be detachably mounted in a container body by being inserted into the container body along an axial direction that is a direction in which an axis of the tubular portion extends; and a cartridge cap that is mounted on the cartridge body by inserting the tubular portion along the axial direction. The cartridge body includes a first locking portion that locks to the container body in the axial direction when the cartridge body is mounted in the container body. The cartridge cap includes a second locking portion that locks to the first locking portion in the axial direction when the cartridge cap is mounted on the cartridge body.

9 Claims, 9 Drawing Sheets

DRAWING MATERIAL CONTAINER CARTRIDGE AND DRAWING MATERIAL CONTAINER SET

TECHNICAL FIELD

The present disclosure relates to a drawing material container cartridge and a drawing material container set.

BACKGROUND

Japanese Unexamined Patent Publication No. 2000-217635 describes a cosmetic container including a cartridge. The cartridge includes a tip tube, a rod body, a guide rod, and an O-ring. The tip tube includes an exposed portion and a rotating portion. An opening hole through which a rod-shaped cosmetic sticks out and retracts, and an annular step portion for mounting a temporary cap are formed at a tip of the exposed portion. The annular step portion is formed slightly below the opening hole. The annular step portion is a portion on which the temporary cap is mounted.

The rotating portion extends downward from the exposed portion. The rotating portion is detachably mounted inside a container body, and rotates relative to the container body. A fitting protrusion is formed on an outer periphery of the rotating portion. The fitting protrusion is fitted to a fitting recess having an annular shape and formed on an inner peripheral surface of the container body. The fitting protrusion is a portion on which the container body is mounted.

In the cartridge above described, the annular step portion on which the temporary cap is mounted and the fitting protrusion on which the container body is mounted are formed at different locations. Since the cartridge includes the annular step portion on which the temporary cap is mounted and the fitting protrusion on which the container body is mounted, the configuration is complicated, which is a problem. Further, when the annular step portion and the fitting protrusion are provided, the number of exposed protrusions and recesses increases, so that there is room for improvement in terms of aesthetic appearance.

An object of the present disclosure is to provide a drawing material container cartridge and a drawing material container set of which the configuration can be simplified and of which the aesthetic appearance can be improved.

SUMMARY (1) A drawing material container cartridge according to the present disclosure includes a cartridge body including a tubular portion that accommodates a drawing material, and being configured to be detachably mounted in a container body by being inserted into the container body along an axial direction that is a direction in which an axis of the tubular portion extends; and a cartridge cap that is mounted on the cartridge body by inserting the tubular portion along the axial direction. The cartridge body includes a first locking portion that locks to the container body in the axial direction when the cartridge body is mounted in the container body. The cartridge cap includes a second locking portion that locks to the first locking portion in the axial direction when the cartridge cap is mounted on the cartridge body.

The drawing material container cartridge includes the cartridge body and the cartridge cap that is mounted on the cartridge body. The cartridge body includes the tubular portion that accommodates the drawing material, and the tubular portion is inserted into the cartridge cap along the axial direction. The cartridge body is mounted in the container body by being inserted into the container body. The cartridge body includes the first locking portion, and the first locking portion locks to the container body in the axial direction. The cartridge cap includes the second locking portion, and the second locking portion locks to the first locking portion of the cartridge body in the axial direction. Therefore, the first locking portion of the cartridge body is a portion that locks to the container body, and is a portion to which the second locking portion of the cartridge cap locks. Therefore, the first locking portion of the cartridge body can be used in common as the portion that locks to the container body and the portion to which the cartridge cap locks. Namely, since the portion that locks to the container body and the portion to which the cartridge cap locks are formed as the first locking portion, the configuration of the cartridge body can be simplified. By using the first locking portion in common as the portion that locks to the container body and the portion to which the cartridge cap locks, the number of protrusions and recesses of the cartridge body can be reduced, so that the aesthetic appearance of the cartridge body can be improved.

(2) In the above (1), the cartridge body may include an insertion portion that is inserted into the container body. The first locking portion may be a step that is increased in diameter from the insertion portion, and the step may come into contact with the container body when the cartridge body is mounted in the container body. In this case, the cartridge cap locks to the step, so that the cartridge cap can be more reliably mounted on the cartridge body. By forming the step as the first locking portion, the configuration of the first locking portion can be simplified, which contributes to further simplifying the configuration.

(3) In the above (1) or (2), the tubular portion may have an inclined surface inclined with respect to the axial direction such that the tubular portion is increased in diameter as the tubular portion extends away from an opening in the axial direction, the drawing material being exposed through the opening. In this case, the inclined surface of the tubular portion that is inserted into the cartridge cap is reduced in diameter as the inclined surface extends toward the opening. Therefore, the insertion of the cartridge body into the cartridge cap can be easily performed.

(4) In any of the above (1) to (3), the cartridge cap may include an inner surface extending along the axial direction, a bottom portion located at one end of the inner surface in the axial direction, and a contact suppression portion that is formed on the inner surface, and that suppresses a contact of the tubular portion with the bottom portion. In this case, the contact suppression portion formed on the inner surface of the cartridge cap suppresses the contact of the tubular portion, which accommodates the drawing material, with the bottom portion. Therefore, the contact of the drawing material with the inner surface of the cartridge cap can be suppressed.

(5) A drawing material container set according to the present disclosure includes the drawing material container cartridge described above; and a container body in which the cartridge body of the drawing material container cartridge is configured to be detachably mounted. In the drawing material container set, the cartridge body of the drawing material container cartridge described above is detachably attachable to the container body. Therefore, similarly to the drawing material container cartridge described above, the configuration can be simplified, and the aesthetic appearance can be improved.

According to the present disclosure, the configuration can be simplified, and the aesthetic appearance can be improved.

DETAILED DESCRIPTION

Figure 1A:
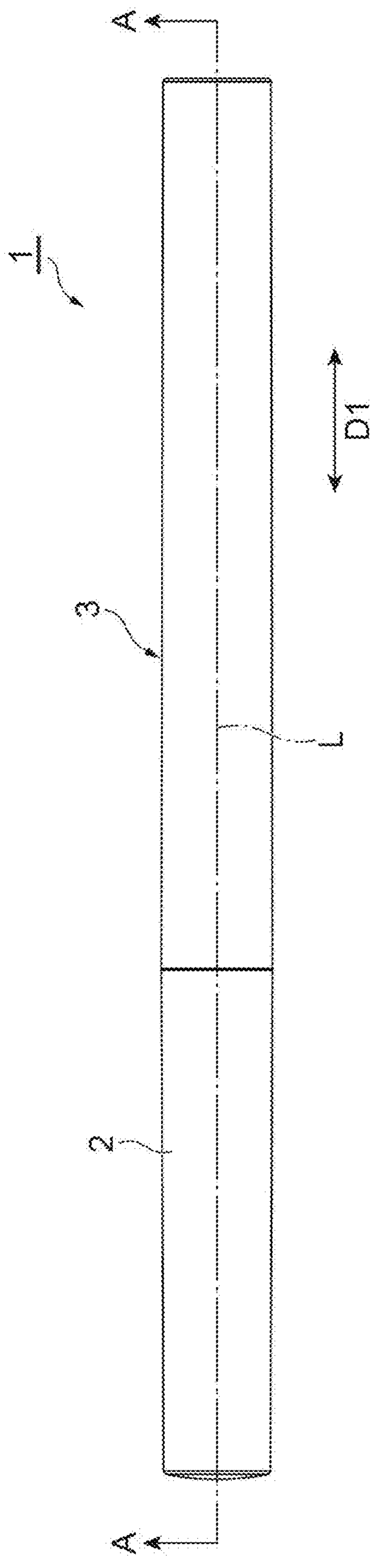
FIG. 1A is a side view showing one example of a drawing material container.

Hereinafter, an embodiment of a drawing material container cartridge and a drawing material container set according to the present disclosure will be described with reference to the drawings. In the description of the drawings, the same or corresponding elements are denoted by the same reference signs, and duplicate descriptions will be omitted as appropriate. The drawings may be depicted in a partially simplified or exaggerated manner for ease of understanding, and dimensional ratios and the like are not limited to those shown in the drawings.

In the present disclosure, a "drawing material" refers to a thing used to draw on an object that is a target of drawing. The "drawing material" may be an application material that is applied to a portion to be applied that is a target of application. The "drawing material" is, for example, a cosmetic. The "cosmetic" is, for example, an eyebrow product, an eyeliner, a lipstick, a lip liner, a lip gloss, a beauty stick, or a concealer.

Figure 1B:
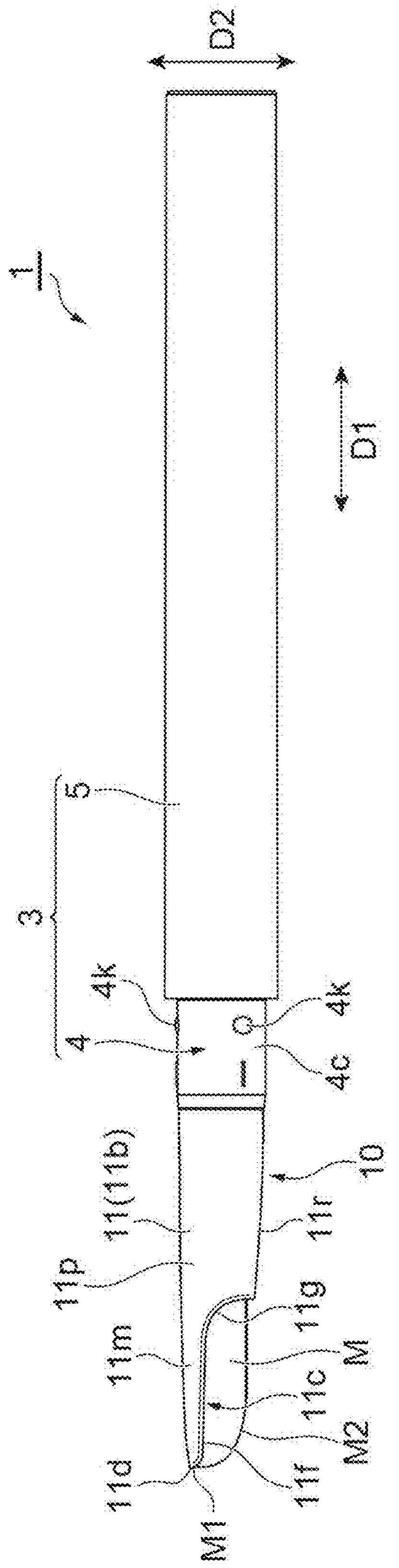
FIG. 1B is a side view showing a state where a cap is removed from the drawing material container in FIG. 1A.

FIG. 1A is a side view showing a drawing material container 1 according to the present embodiment. FIG. 1B is a side view showing a state where a cap 2 of the drawing material container 1 is removed from the drawing material container 1. In the present embodiment, the drawing material container 1 will be described as one example of a drawing material container. As shown in FIGS. 1A and 1B, the drawing material container 1 includes the cap 2, a container body 3, and a cartridge body 11 of a drawing material container cartridge 10.

Figure 2:
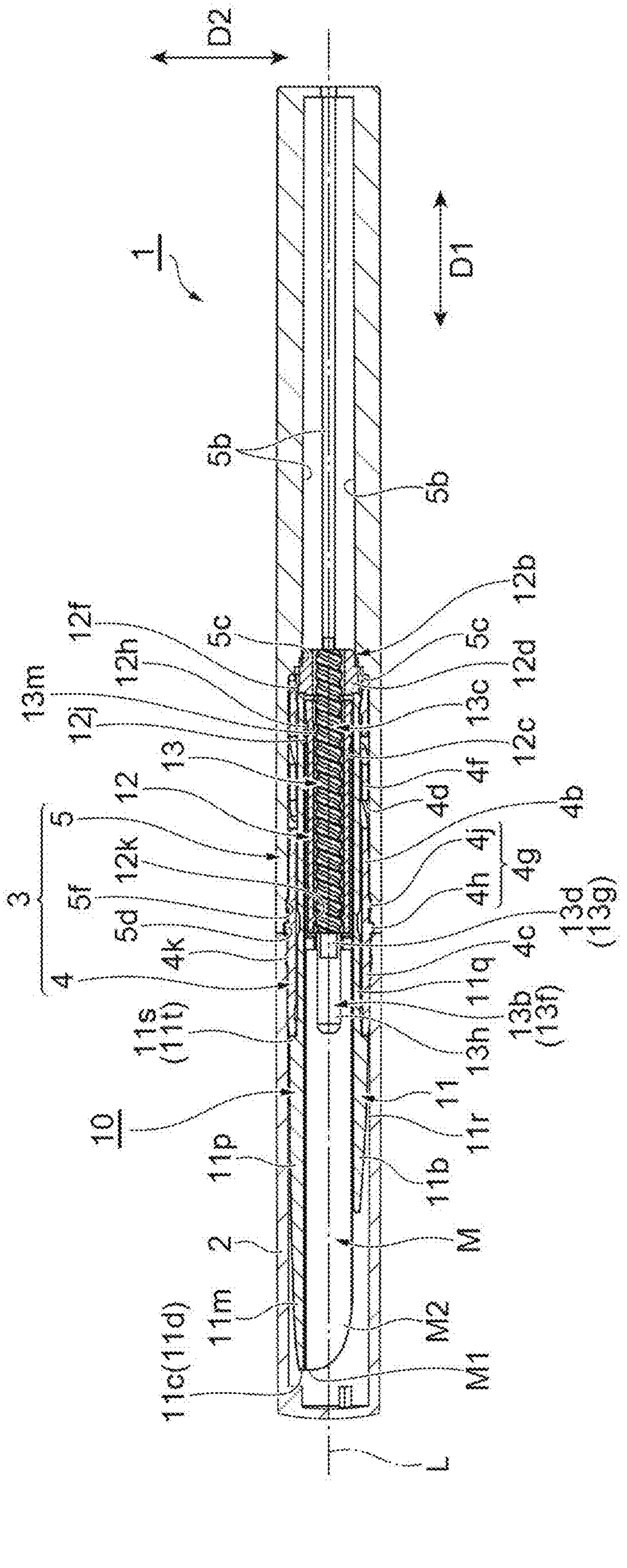
FIG. 2 is a cross-sectional view taken along line A-A of FIG. 1A.

FIG. 2 is a cross-sectional view taken along line A-A of FIG. 1A. As shown in FIGS. 1A, 1B, and 2, the cap 2 has a bottomed tubular shape (for example, a bottomed cylindrical shape). The container body 3 includes, for example, an inner tube 4 into which the cartridge body 11 and a screw tube 12 of the drawing material container cartridge 10 are inserted, and an outer tube 5 that accommodates a part of the inner tube 4.

In the drawing material container 1, some of components including the cap 2, the inner tube 4, and the outer tube 5 have a tubular shape. In the drawing material container 1, when the components are assembled, directions in which axes L of a plurality of tubular components extend coincide with each other. Hereinafter, the direction in which the axis L extends is referred to as an axial direction D1. For example, the axial direction D1 coincides with a longitudinal direction of the drawing material container 1.

The terms "front", "front side", and "forward" refer to a direction from the container body 3 toward the cap 2 in the axial direction D1, and the terms "rear", "rear side", and "rearward" refer to a direction from the cap 2 toward the container body 3 in the axial direction D1. The term "radial direction" refers to a direction toward the axis L or a direction away from the axis L in a plane perpendicular to the axis L. The term "radial outside" refers to a direction away from the axis L in the radial direction, and the term "radial inside" refers to a direction toward the axis L in the radial direction. The term "circumferential direction" refers to a direction along a ring centered on the axis L (rotation direction). In the present embodiment, a direction in which the drawing material is fed out is forward (advancing direction), and an opposite direction thereto is rearward.

The drawing material container 1 has a rod shape extending along the axial direction D1. The drawing material container 1 feeds out a drawing material M. For example, the drawing material container 1 is a pen-type container that feeds out (pushes out) the drawing material M accommodated inside the drawing material container 1. The drawing material M is, for example, in a solid form. In the present embodiment, the drawing material M is a rod-shaped cosmetic extending along the axial direction D1. As one example, the drawing material M may be an eyebrow material, and in this case, the drawing material container 1 is an eyebrow application container.

For example, the outer tube 5 has a bottomed tubular shape. The outer tube 5 includes, for example, a first protrusion 5*b* protruding from an inner surface of the outer tube 5 toward the radial inside of the outer tube 5 and extending along the axial direction D1, and a second protrusion 5*c* protruding from the inner surface of the outer tube 5 toward the radial inside of the outer tube 5 and located in front of the first protrusion 5*b*.

For example, the outer tube 5 includes a plurality of the first protrusions 5*b* and a plurality of the second protrusions 5*c*, and the plurality of first protrusions 5*b* and the plurality of second protrusions 5*c* are arranged along the circumferential direction of the outer tube 5. For example, a height of the second protrusions 5*c* toward the radial inside is smaller than a height of the first protrusions 5*b* toward the radial inside. The second protrusions 5*c* are portions with which the screw tube 12 engages in the circumferential direction. The outer tube 5 includes a first annular recess 5*d* recessed toward the radial outside of the outer tube 5 at a front end of the outer tube 5, and a second annular recess 5*f* recessed toward the radial outside of the outer tube 5 behind the first annular recess 5*d*. The first annular recess 5*d* and the second annular recess 5*f* are portions with which the inner tube 4 engages.

For example, the inner tube 4 includes an insertion portion 4*b* that is inserted into the outer tube 5, and an exposed portion 4*c* that protrudes forward from the outer tube 5. The insertion portion 4*b* includes a spring portion 4*f* having elasticity in the axial direction D1 due to the formation of a slit 4*d* having a helical shape, and an engaging portion 4*g* that is located in front of the spring portion 4*f*, and that engages with the inner surface of the outer tube 5.

The engaging portion 4*g* includes a first annular protrusion 4*h* protruding from an outer peripheral surface of the inner tube 4 toward the radial outside of the inner tube 4, and a second annular protrusion 4*j* protruding from the outer peripheral surface of the inner tube 4 toward the radial outside of the inner tube 4 behind the first annular protrusion 4*h*. The first annular protrusion 4*h* engages with the first annular recess 5*d* of the outer tube 5, and the second annular protrusion 4*j* engages with the second annular recess 5*f* of the outer tube 5. The inner tube 4 engages with the outer tube 5 to be immovable in the axial direction and rotatable synchronously therewith. The exposed portion 4*c* has a tubular shape. The inner tube 4 includes a protrusion 4*k*, with which the cap 2 engages, on an outer peripheral surface of the exposed portion 4*c*.

Next, the cartridge body 11, the screw tube 12, and a movable body 13 of the drawing material container cartridge 10 that are mounted in the container body 3 will be described. The cartridge body 11, the screw tube 12, and the movable body 13 are detachably attachable to the container body 3. The drawing material container cartridge 10 includes, for example, the cartridge body 11 including a tubular portion 11*b* that accommodates the drawing material M; the screw tube 12 including a portion that is inserted into the cartridge body 11; and the movable body 13 that moves along the axial direction D1 with respect to the screw tube 12 inside the screw tube 12.

Figure 3:
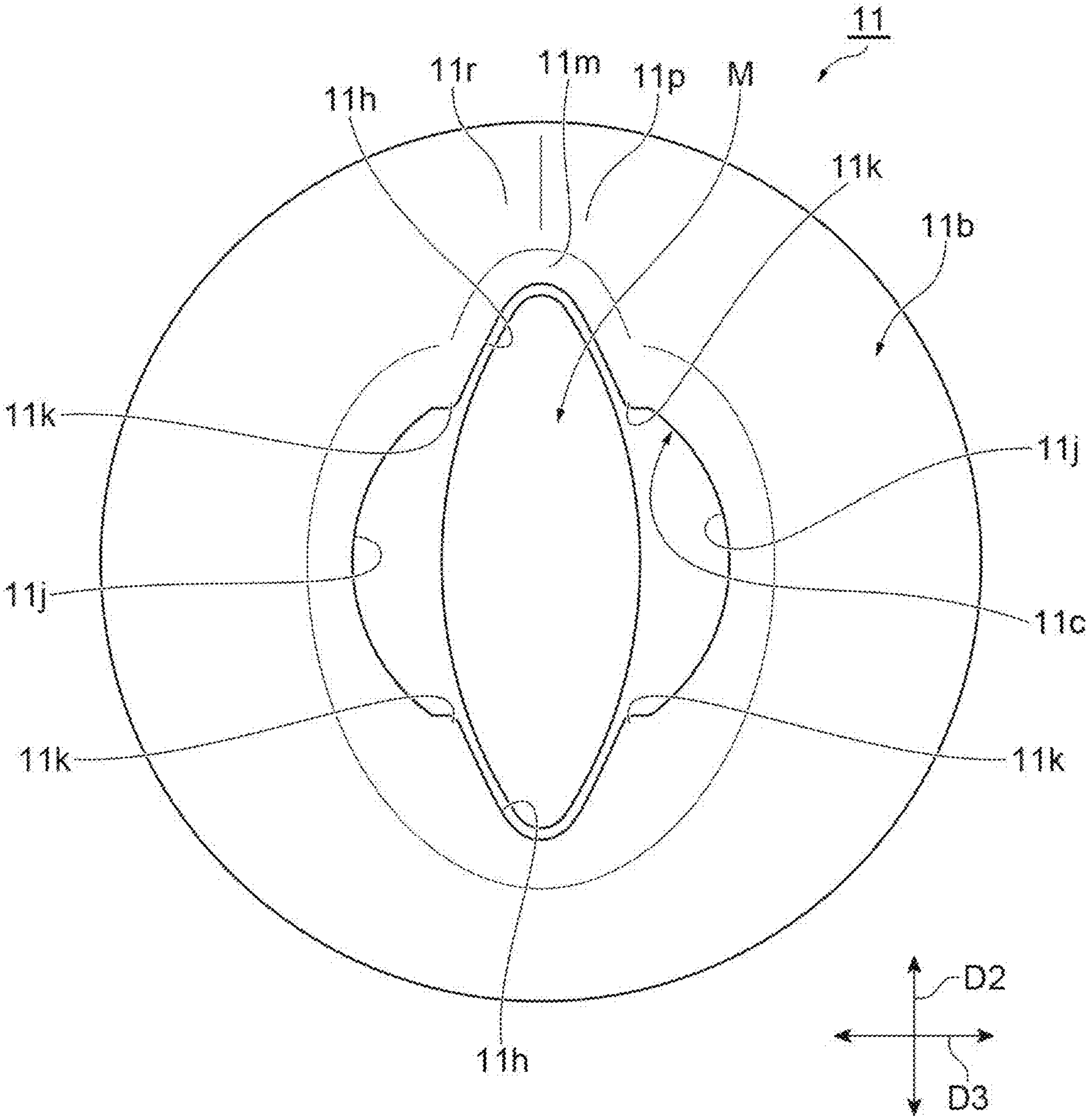
FIG. 3 is a front view showing a cartridge body and a drawing material of a drawing material container cartridge according to an embodiment.

FIG. 3 is a front view showing the cartridge body 11 when viewed from the front. As shown in FIGS. 1B, 2, and 3, the cartridge body 11 is a tip tube located on the front side of the drawing material container 1. The tubular portion 11*b* has an opening 11*c* through which the drawing material M is exposed, and an inclined surface 11*r* inclined with respect to the axial direction D1 such that the tubular portion 11*b* is increased in diameter as the tubular portion 11*b* extends away from the opening 11*c* in the axial direction D1.

The cartridge body 11 is detachably mounted in the container body 3 by being inserted into the container body 3 along the axial direction D1 that is the direction in which the axis L of the tubular portion 11*b* extends. The opening 11*c* is defined, for example, by a front end 11*d* of the cartridge body 11, a first extending portion 11*f* that curves to bulge from the front end 11*d* and that extends rearward, and a second extending portion 11*g* extending obliquely rearward with respect to a rear end of the first extending portion 11*f*.

When viewed from the front, the opening 11*c* has a non-circular shape. When viewed from the front, the opening 11*c* extends in a major axis direction D2 that is a direction intersecting the axial direction D1, and a minor axis direction D3 that is a direction intersecting both the axial direction D1 and the major axis direction D2. A length of the opening 11*c* in the major axis direction D2 is longer than a length of the opening 11*c* in the minor axis direction D3.

When viewed from the front, the opening 11*c* includes a first protruding portion 11*h* protruding in the major axis direction D2; a second protruding portion 11*j* protruding in the minor axis direction D3; and a corner portion 11*k* protruding toward the radial inside of the tubular portion 11*b* between the first protruding portion 11*h* and the second protruding portion 11*j*. For example, the opening 11*c* includes a pair of the first protruding portions 11*h* arranged along the major axis direction D2, and a pair of the second protruding portions 11*j* arranged along the minor axis direction D3.

Each of the first protruding portions 11*h* protrudes in the major axis direction D2 from a pair of the corner portions 11*k* arranged along the minor axis direction D3. For example, the first protruding portions 11*h* have a V-shape of which the corner portions are rounded. Each of the second protruding portions 11*j* protrudes in the minor axis direction D3 from a pair of the corner portions 11*k* arranged along the major axis direction D2. For example, the second protruding portions 11*j* have an arc shape.

For example, a cross section of the drawing material M when cut along a plane perpendicular to the axis L has a non-circular shape. More specifically, a cross section of the drawing material M when cut along a plane perpendicular to the axis L has an elongated circle shape (or elliptical shape) having a major axis extending in the major axis direction D2 and a minor axis extending in the minor axis direction D3.

For example, the shape of the drawing material M when viewed from the front is the same as the cross-sectional shape of the drawing material M when cut along a plane perpendicular to the axis L. The drawing material M when viewed along the minor axis direction D3 includes a front end M1 and a curved portion M2 that curves from the front end M1 in the major axis direction D2 and toward the rear to bulge toward the outside of the drawing material M.

The external shape of the tubular portion 11*b* when viewed from the front is, for example, a circular shape. For example, the tubular portion 11*b* includes a one-side holding portion 11*m* that holds the drawing material M from one side in the major axis direction D2, and a tubular holding portion 11*p* that extends rearward from the one-side holding portion 11*m*, and that holds the drawing material M in both the major axis direction D2 and the minor axis direction D3.

At least one-side portion of the drawing material M in the major axis direction D2 is exposed at the one-side holding portion 11*m*, and the drawing material M is not exposed at the tubular holding portion 11*p*. The shape of the one-side holding portion 11*m* when viewed from the front is, for example, a U-shape. The shape of the cartridge body 11 when cut along a plane orthogonal to the axial direction D1 transitions from a non-circular shape to a circular shape as the cartridge body 11 extends from the one-side holding portion 11*m* toward the rear.

The cartridge body 11 includes an insertion portion 11*q* that is inserted into the container body 3. For example, the insertion portion 11*q* has a tubular shape. The cartridge body 11 includes a first locking portion 11*s* that locks to the container body 3 in the axial direction D1 when the cartridge body 11 is mounted in the container body 3. The first locking portion 11*s* is located, for example, at a rear end of the inclined surface 11*r*.

For example, the first locking portion 11*s* is located at a portion where the cartridge body 11 is increased the most in diameter (a portion where the diameter of the cartridge body 11 is at its largest). For example, the first locking portion 11*s* is a step 11*t* that is increased in diameter from the insertion portion 11*q*. Namely, the step 11*t* protrudes from the insertion portion 11*q* toward the radial outside of the cartridge body 11. The step 11*t* comes into contact with the container body 3 (inner tube 4) when the cartridge body 11 is mounted in the container body 3.

Figure 4:
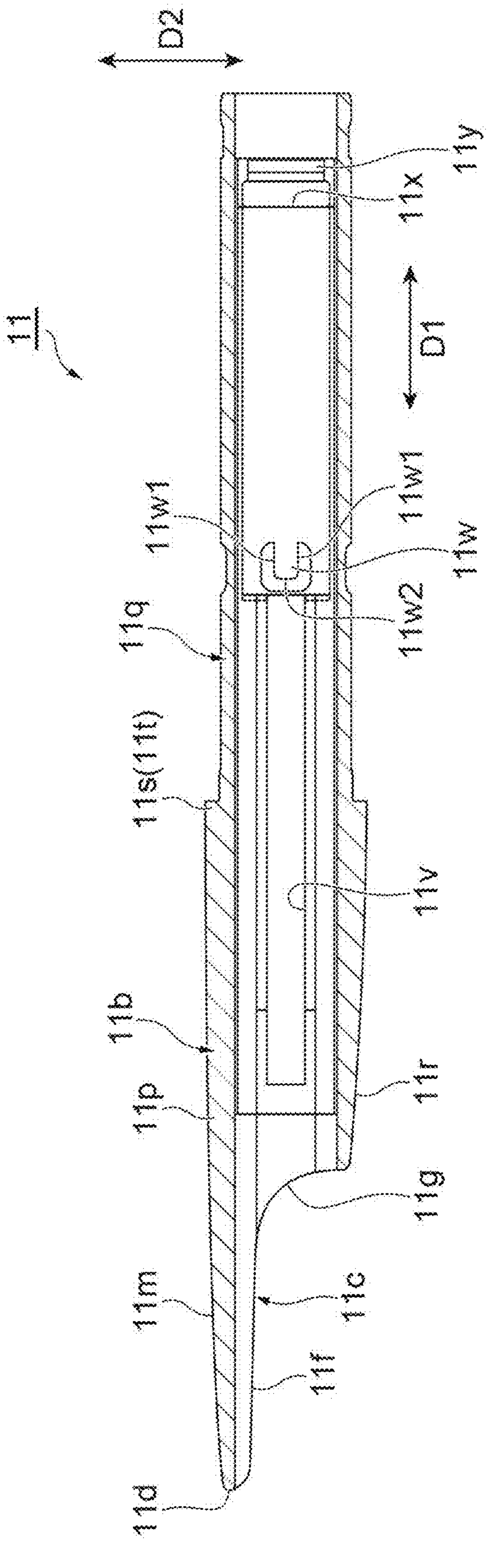
FIG. 4 is a cross-sectional view showing the cartridge body of FIG. 3.

FIG. 4 is a cross-sectional view of the cartridge body 11 when cut along a plane extending in both the axial direction D1 and the major axis direction D2. As shown in FIG. 4, the cartridge body 11 (insertion portion 11*q*) includes, for example, an elastically deformable portion 11*w* that elastically deforms in the radial direction of the cartridge body 11. For example, the cartridge body 11 includes a pair of the elastically deformable portions 11*w*, and the pair of elastically deformable portions 11*w* are arranged along the radial direction of the cartridge body 11.

Each of the elastically deformable portions 11*w* is formed, for example, in a region surrounded by a pair of first slits 11*w*1 extending in the axial direction D1 and arranged along the circumferential direction of the cartridge body 11, and a second slit 11*w*2 connecting front ends of the pair of first slits 11*w*1 to each other. Each of the first slits 11*w*1 and the second slit 11*w*2 penetrates through the cartridge body 11 in the radial direction. By causing the cartridge body 11 to include the elastically deformable portions 11*w*, the assembly of the cartridge body 11 to the container body 3 can be easily performed.

The cartridge body 11 includes a hole portion 11*x* recessed toward the radial outside of the cartridge body 11 on the rear side of an inner surface of the cartridge body 11, and a protrusion 11*y* located at a rear portion of the hole portion 11*x*. For example, the hole portion 11*x* penetrates through the cartridge body 11 in the radial direction. The hole portion 11*x* and the protrusion 11*y* are portions with which the screw tube 12 engages in the axial direction D1. By engaging the screw tube 12 with the hole portion 11*x* and the protrusion 11*y*, the screw tube 12 is engaged with the cartridge body 11 to be immovable in the axial direction D1 and rotatable relative thereto.

The cartridge body 11 includes a recess 11*v* on the inner surface of the cartridge body 11, the recess 11*v* being recessed toward the radial outside of the cartridge body 11. The recess 11*v* has, for example, a rectangular shape having long sides extending along the axial direction D1 and short sides extending along the circumferential direction of the cartridge body 11.

For example, the cartridge body 11 includes two recesses 11*v*, and the two recesses 11*v* are arranged along the radial direction of the cartridge body 11. The recesses 11*v* are portions with which the movable body 13 engages in the circumferential direction. By engaging the movable body 13 with the recesses 11*v* in the circumferential direction, the movable body 13 is engaged with the cartridge body 11 to be rotatable synchronously therewith.

Figure 5:
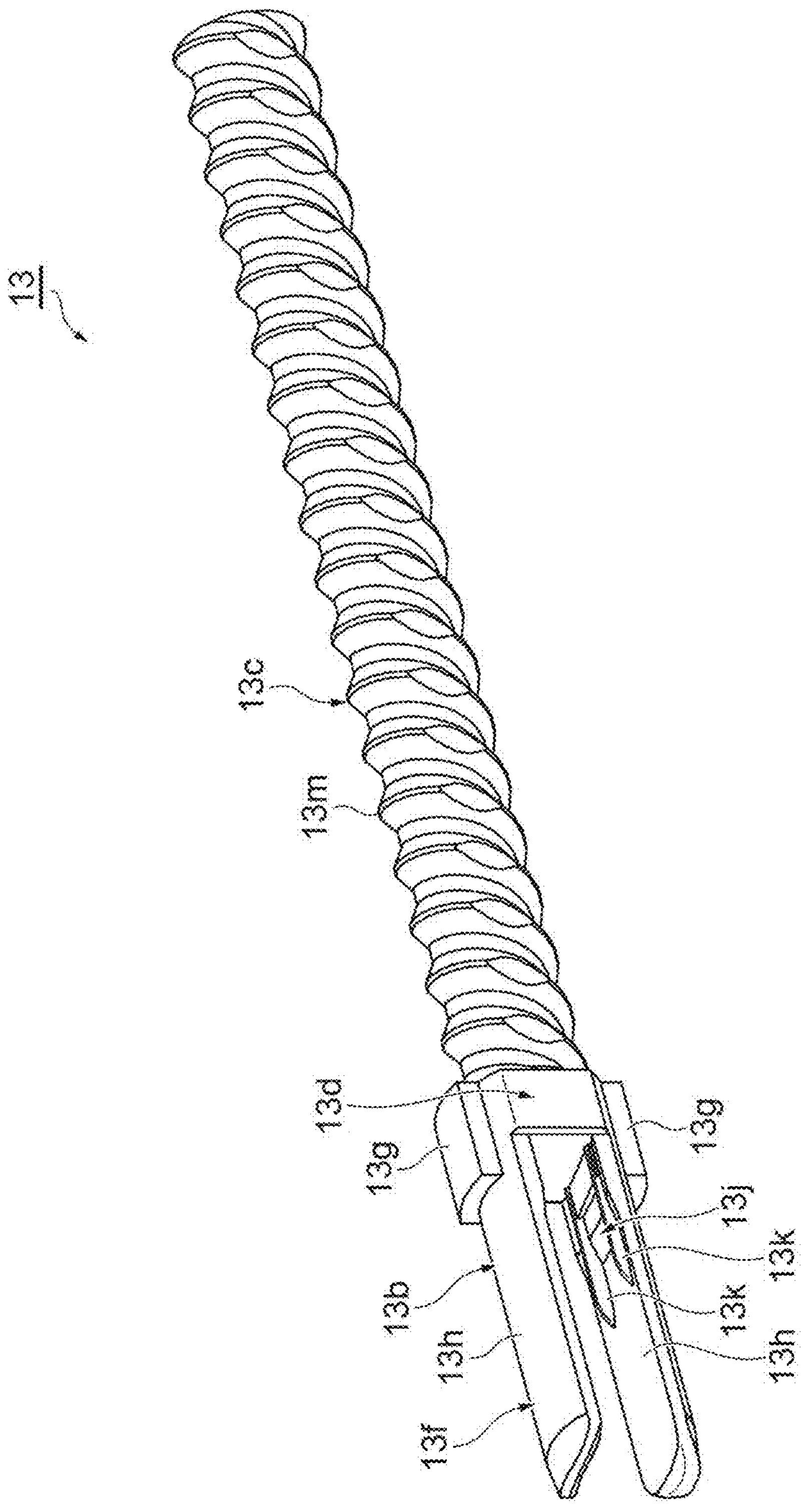
FIG. 5 is a perspective view showing a movable body of the drawing material container cartridge according to the embodiment.

FIG. 5 is a perspective view illustrating the movable body 13. As shown in FIGS. 2 and 5, the movable body 13 includes a drawing material holding portion 13*b* that holds the drawing material M, and a screw portion 13*c* extending rearward from the drawing material holding portion 13*b*. The drawing material holding portion 13*b* holds a rear portion of the drawing material M. For example, the drawing material holding portion 13*b* includes a base portion 13*d* and a grip portion 13*f* extending from the base portion 13*d* to a side opposite to the screw portion 13*c*.

For example, the movable body 13 has a round rod shape. The base portion 13*d* is located at a front end of the screw portion 13*c*. The base portion 13*d* includes a protrusion 13*g* protruding toward the radial outside of the movable body 13, and extending in the circumferential direction of the movable body 13. The protrusion 13*g* is a portion that engages with the recess 11*v* of the cartridge body 11 (refer to FIG. 4).

By engaging the protrusion 13*g* with the recess 11*v*, the movable body 13 is engaged with the cartridge body 11 to be rotatable synchronously therewith. For example, the base portion 13*d* includes a pair of the protrusions 13*g*, and the pair of protrusions 13*g* are arranged along the radial direction of the movable body 13. The grip portion 13*f* includes, for example, a pair of arm portions 13*h* extending forward from the base portion 13*d* and extending in the circumferential direction of the movable body 13.

Figure 6:
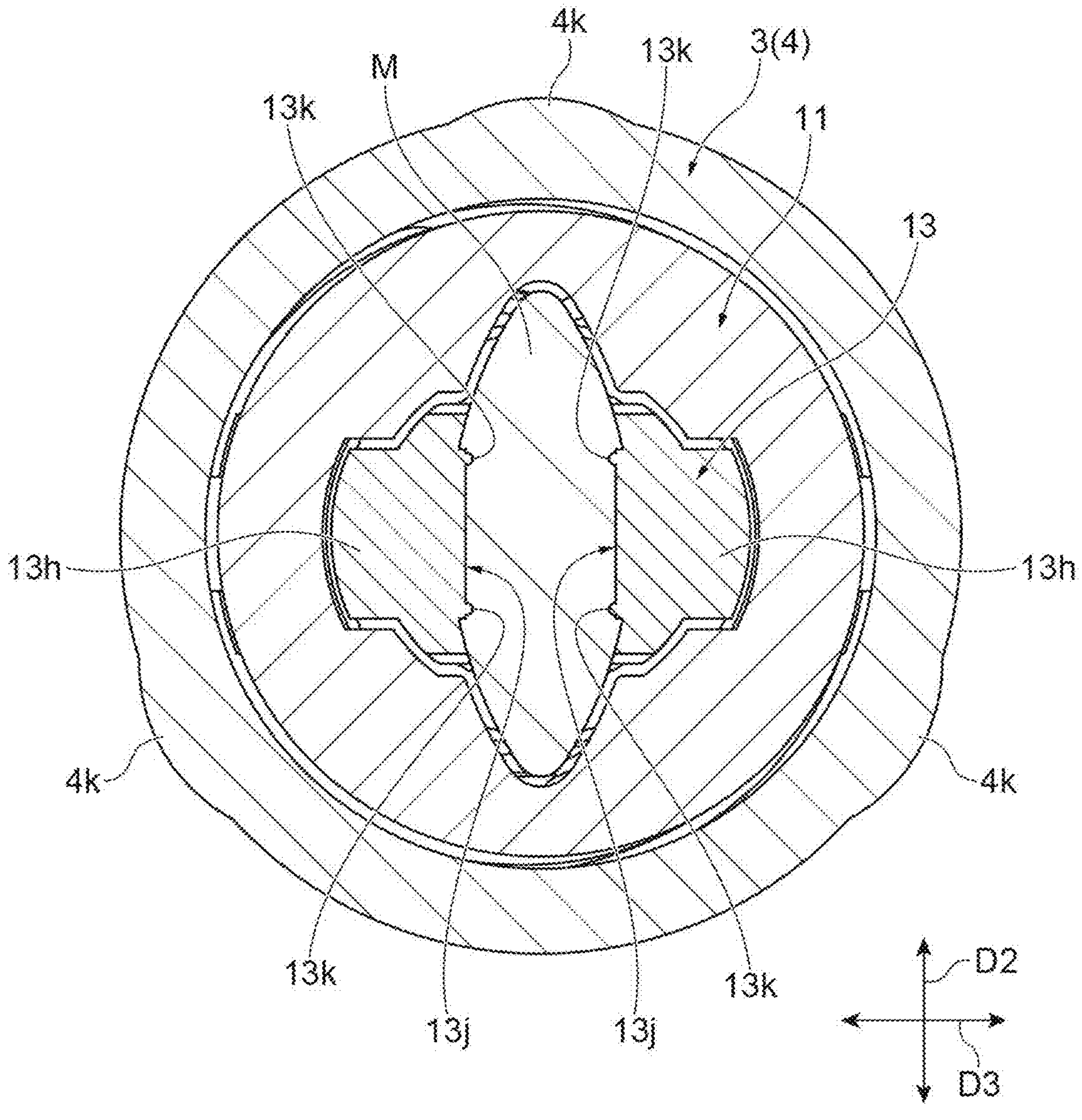
FIG. 6 is a cross-sectional view showing the cartridge body, the movable body, the drawing material, and a container body of the drawing material container cartridge according to the embodiment.

FIG. 6 is a cross-sectional view showing the container body 3, the cartridge body 11, the movable body 13, and the drawing material M when cut along a plane extending in both the major axis direction D2 and the minor axis direction D3. As shown in FIGS. 2, 5, and 6, the grip portion 13*f* grips the drawing material M by pinching the drawing material M between the pair of arm portions 13*h*. The arm portion 13*h* includes, for example, a protruding portion 13*j* protruding toward the radial inside of the movable body 13.

For example, the protruding portion 13*j* is a portion that bites into the drawing material M. In the grip portion 13*f*, the protruding portion 13*j* bites into the drawing material M, so that the drawing material M can be firmly held. The protruding portion 13*j* includes a plurality (as one example, two) of projections 13*k* extending in the axial direction D1 and arranged along the circumferential direction of the movable body 13.

The movable body 13 is movable along the axial direction D1 with respect to the screw tube 12 in a state where the movable body 13 is inserted into the screw tube 12. The drawing material M is fed out from the opening 11*c* of the cartridge body 11 by moving the movable body 13 forward with respect to the screw tube 12, and the drawing material M is retracted into the opening 11*c* by moving the movable body 13 rearward with respect to the screw tube 12. The screw portion 13*c* is a portion that is inserted into the screw tube 12, and includes a male screw 13*m* that is screwed into the screw tube 12 inside the screw tube 12.

Figure 7A:
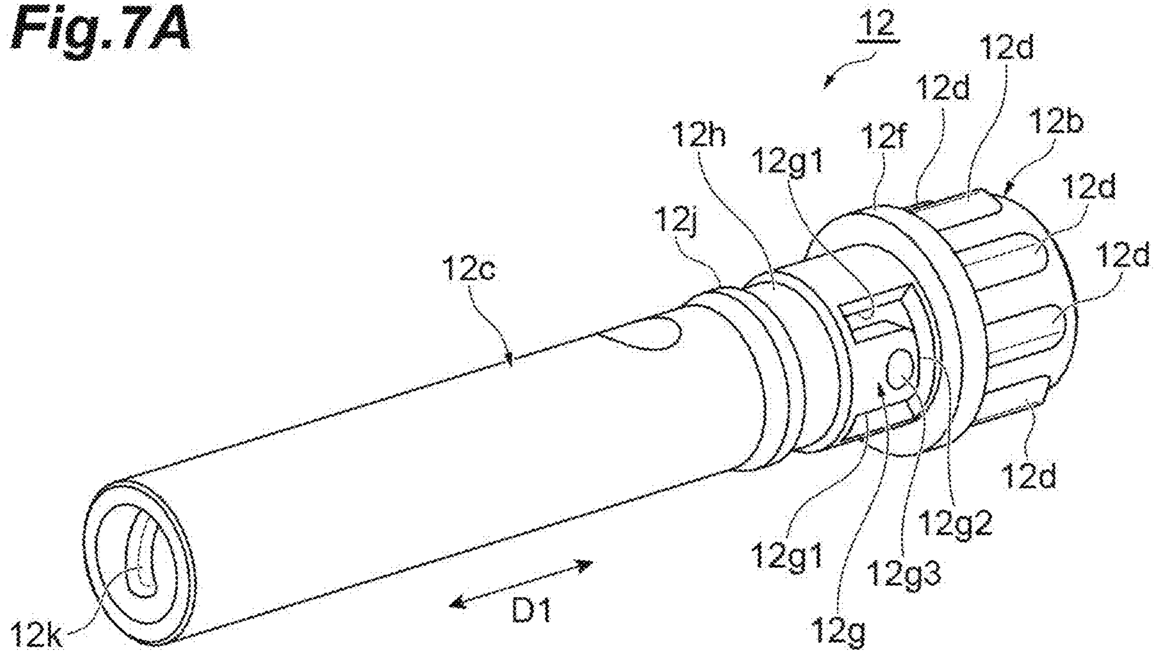
FIG. 7A is a perspective view showing a screw tube of the drawing material container cartridge according to the embodiment.
Figure 7B:
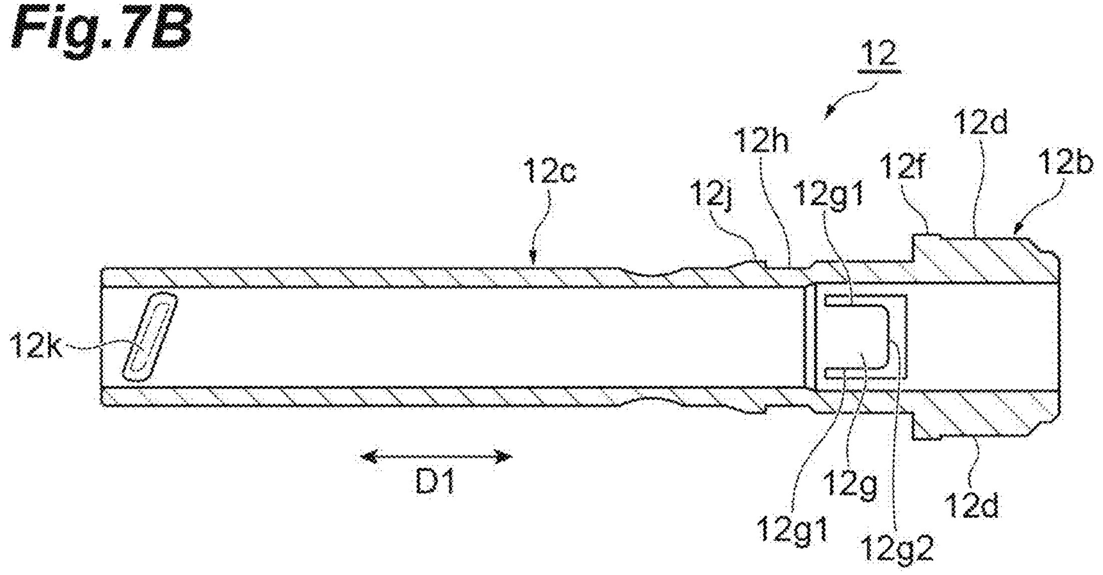
FIG. 7B is a cross-sectional view showing the screw tube of FIG. 7A.

FIG. 7A is a perspective view showing the screw tube 12. FIG. 7B is a cross-sectional view of the screw tube 12 when cut along a plane extending in the axial direction D1. As shown in FIGS. 2, 7A, and 7B, the screw tube 12 includes an engaging portion 12*b* that engages with an inner surface of the container body 3 (outer tube 5), and an insertion portion 12*c* that is located in front of the engaging portion 12*b*, and that is inserted into the cartridge body 11.

For example, the engaging portion 12*b* includes a protrusion 12*d* protruding toward the radial outside of the screw tube 12. The protrusion 12*d* engages with the second protrusion 5*c* in the circumferential direction, which is formed on the inner surface of the outer tube 5. By engaging the protrusion 12*d* with the second protrusion 5*c* in the circumferential direction, the screw tube 12 is engaged with the container body 3 (outer tube 5) to be rotatable synchronously therewith. For example, the engaging portion 12*b* includes a plurality of the protrusions 12*d*, and the plurality of protrusions 12*d* are arranged along the circumferential direction of the screw tube 12.

For example, the screw tube 12 includes a flange portion 12*f* located between the engaging portion 12*b* and the insertion portion 12*c*. The insertion portion 12*c* is a portion extending forward from the flange portion 12*f*, and has, for example, a tubular shape. The insertion portion 12*c* includes, for example, an elastically deformable portion 12*g* that elastically deforms in the radial direction of the screw tube 12. For example, the screw tube 12 includes a pair of the elastically deformable portions 12*g*, and the pair of elastically deformable portions 12*g* are arranged along the radial direction of the screw tube 12.

The elastically deformable portion 12*g* is formed, for example, in a region surrounded by a pair of first slits 12*g*1 extending in the axial direction D1 and arranged along the circumferential direction of the screw tube 12, and a second slit 12*g*2 connecting rear ends of the pair of first slits 12*g*1 to each other. Each of the first slits 12*g*1 and the second slit 12*g*2 penetrates through the screw tube 12 in the radial direction. For example, the elastically deformable portions 12*g* include protrusions 12*g*3 protruding toward the radial outside of the screw tube 12.

The insertion portion 12*c* includes an annular recess 12*h* and an annular protrusion 12*j* located in front of the annular recess 12*h*. The annular recess 12*h* engages with the protrusion 11*y* (refer to FIG. 4) of the cartridge body 11, and the annular protrusion 12*j* engages with the hole portion 11*x* of the cartridge body 11. By engaging the protrusion 11*y* with the annular recess 12*h*, and engaging the annular protrusion 12*j* with the hole portion 11*x*, the screw tube 12 is engaged with the cartridge body 11 to be immovable in the axial direction D1 and rotatable relative thereto.

The screw tube 12 includes a female screw 12*k* formed on an inner surface of the insertion portion 12*c*. For example, the female screw 12*k* protrudes from an inner surface of the screw tube 12 toward the radial inside, and extends obliquely with respect to the circumferential direction of the screw tube 12. The female screw 12*k* is a portion into which the male screw 13*m* of the movable body 13 is screwed. By screwing the female screw 12*k* to the male screw 13*m*, the screw tube 12 is screwed and coupled to the movable body 13.

The cartridge body 11, the screw tube 12, and the movable body 13 are detachably attachable to the container body 3 (inner tube 4) in a state where the cap 2 is removed from the container body 3. For example, after the drawing material M accommodated inside the cartridge body 11 is used up, the cartridge body 11, the screw tube 12, and the movable body 13 are removed from the container body 3.

Figure 8A:
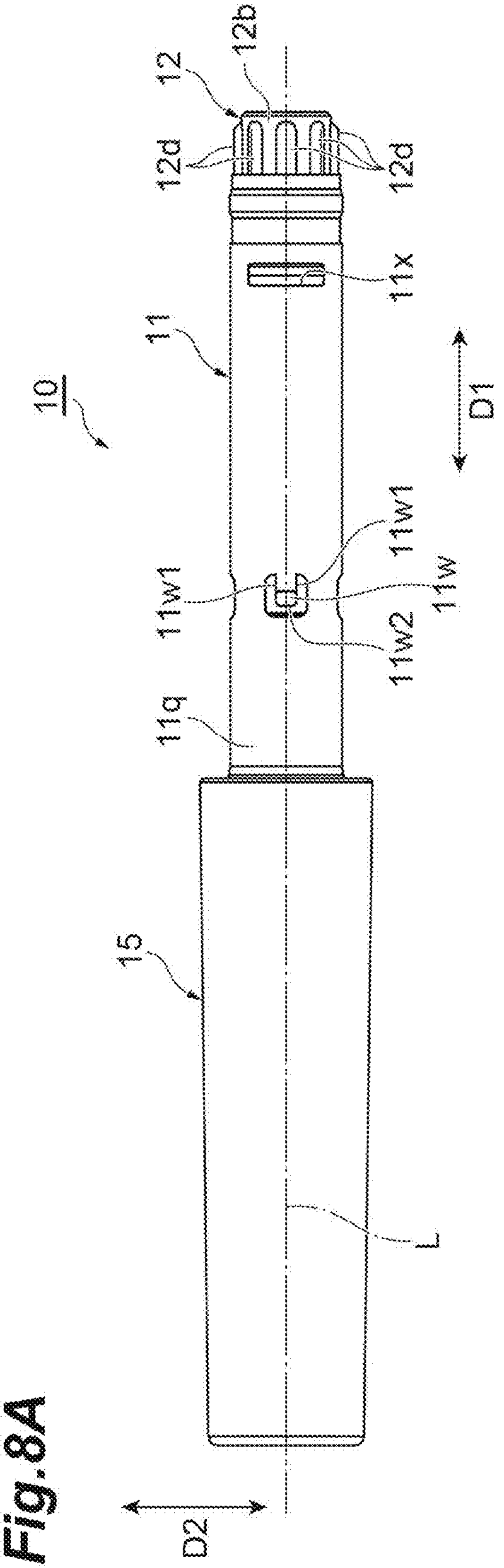
FIG. 8A is a side view showing the drawing material container cartridge according to the embodiment.
Figure 8B:
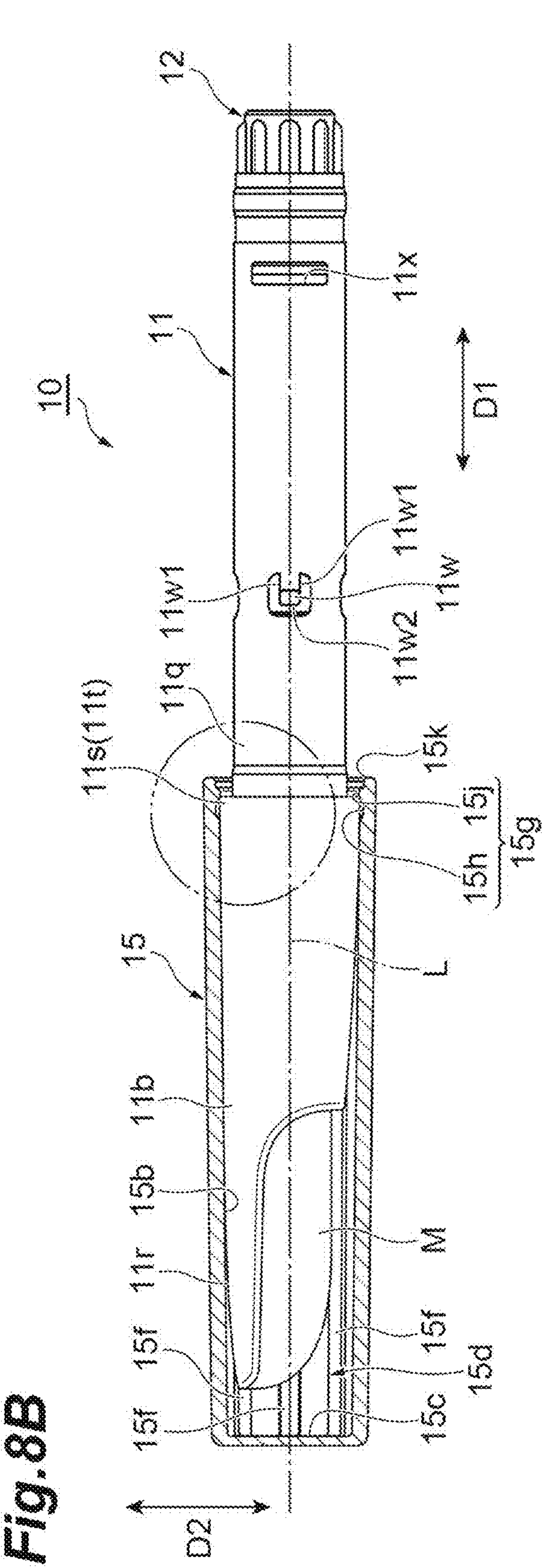
FIG. 8B is a partial cross-sectional view showing the drawing material container cartridge of FIG. 8A.

Then, the cartridge body 11, the screw tube 12, and the movable body 13 that are new are mounted in the container body 3. For example, as shown in FIGS. 8A and 8B, the drawing material container cartridge 10 includes a cartridge cap 15. The cartridge body 11, the screw tube 12, and the movable body 13 are held by the cartridge cap 15 before being mounted in the container body 3.

FIG. 8A is a side view showing the drawing material container cartridge 10 including the cartridge cap 15. FIG. 8B is a cross-sectional view showing the drawing material container cartridge 10 when cut along a plane extending in both the axial direction D1 and the major axis direction D2. The cartridge cap 15 is, for example, a temporary cap that is mounted on the cartridge body 11 when the drawing material container cartridge 10 is solely sold as a replacement.

The cartridge cap 15 has, for example, a bottomed tubular shape (as one example, a bottomed cylindrical shape). The cartridge cap 15 is mounted on the cartridge body 11 by inserting the tubular portion 11*b* of the cartridge body 11 along the axial direction D1. The cartridge cap 15 includes an inner surface 15*b* extending along the axial direction D1, and a bottom portion 15*c* located at one end of the inner surface 15*b* in the axial direction D1.

The cartridge cap 15 includes a contact suppression portion 15*d* that suppresses the contact of the tubular portion 11*b* with the bottom portion 15*c*. The contact suppression portion 15*d* is formed on the inner surface 15*b*. For example, the contact suppression portion 15*d* is a rib 15*f* protruding from the inner surface 15*b* toward the radial inside of the cartridge cap 15.

For example, the cartridge cap 15 includes a plurality of the ribs 15*f*, and the plurality of ribs 15*f* are arranged along the circumferential direction of the cartridge cap 15. A protruding height of the ribs 15*f* on the inner surface 15*b* is, for example, constant. When the tubular portion 11*b* is inserted into the cartridge cap 15 from the opening 15*k* of the cartridge cap 15, the inclined surface 11*r* of the tubular portion 11*b* comes into contact with the ribs 15*f*, and the tubular portion 11*b* does not advance any further. Accordingly, the contact of the tubular portion 11*b* with the bottom portion 15*c* is suppressed.

Figure 9:
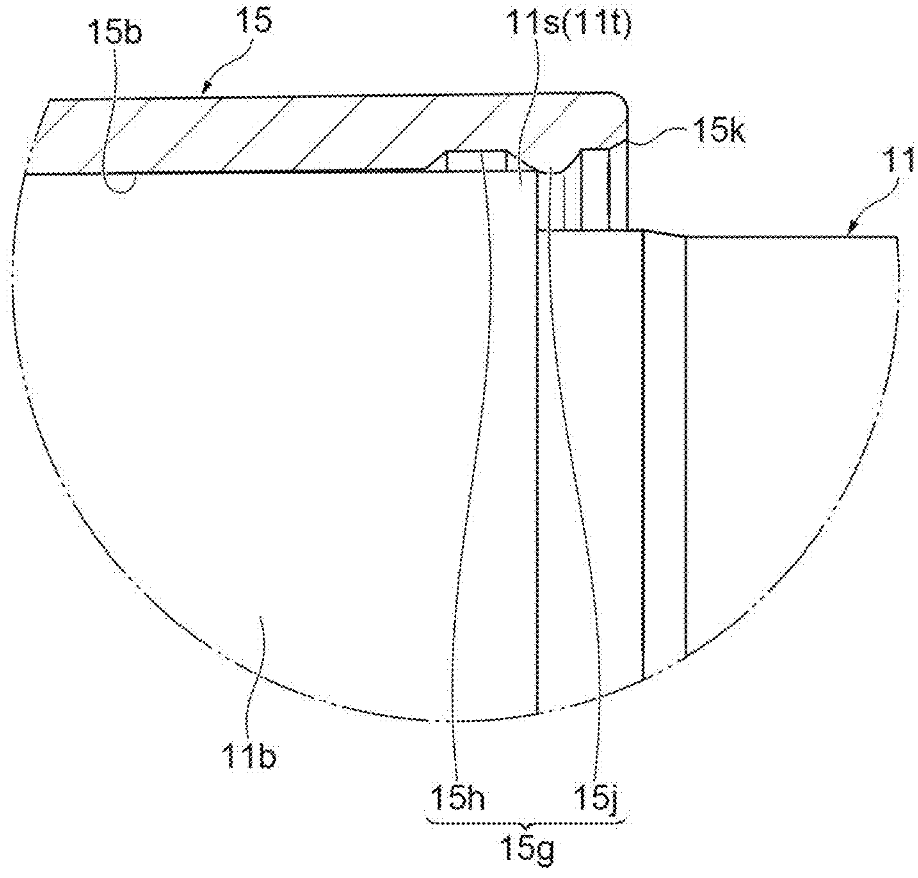
FIG. 9 is an enlarged cross-sectional view of a first locking portion and a second locking portion of the drawing material container cartridge of FIG. 8B.

The cartridge cap 15 includes a second locking portion 15*g* that locks to the first locking portion 11*s* of the cartridge body 11 in the axial direction D1 when the cartridge cap 15 is mounted on the cartridge body 11. FIG. 9 is an enlarged view of the second locking portion 15*g* and the first locking portion 11*s* of FIG. 8B. The second locking portion 15*g* includes, for example, an annular recess 15*h* and an annular protrusion 15*j* located between the annular recess 15*h* and the opening 15*k*.

For example, the annular protrusion 15*j* is a portion onto which the step 11*t* is hooked. By hooking the annular protrusion 15*j* onto the step 11*t*, the second locking portion 15*g* is locked to the first locking portion 11*s*. For example, a height of the annular protrusion 15*j* on the inner surface 15*b* is the same as the height of the ribs 15*f*, and a height of the annular recess 15*h* is the same as a height of portions of the inner surface 15*b* where the ribs 15*f* are not formed.

For example, in a cross section of the second locking portion 15*g* when cut along a plane extending in the axial direction D1, the annular recess 15*h* and the annular protrusion 15*j* have a trapezoidal shape. In the cross section, at least one of corner portions of the annular recess 15*h* and corner portions of the annular protrusion 15*j* may be rounded.

Next, an example of a method for using the drawing material container cartridge 10 will be described. Hereinafter, a procedure for removing the drawing material container cartridge 10 from the container body 3 of the drawing material container 1 in which the drawing material M is used up and then mounting the new drawing material container cartridge 10 in the container body 3 will be described. For example, as shown in FIGS. 8A and 8B, the new drawing material container cartridge 10 includes the cartridge body 11, the screw tube 12, the movable body 13, and the cartridge cap 15, and the first locking portion 11*s* of the cartridge body 11 locks to the second locking portion 15*g* of the cartridge cap 15. Specifically, the step 11*t* of the first locking portion 11*s* is hooked onto the annular protrusion 15*j* of the second locking portion 15*g* in a state where the tubular portion 11*b* is inserted into the cartridge cap 15.

First, the cartridge body 11, the screw tube 12, and the movable body 13 are removed from the container body 3 of the drawing material container 1 in which the drawing material M is used up. For example, in the state shown in FIG. 2, by removing the cap 2 from the container body 3 (inner tube 4) and pulling the cartridge body 11 forward, the engaging portion 12*b* is moved forward with respect to the second protrusions 5*c*. At this time, the cartridge body 11 and the screw tube 12 move forward with respect to the container body 3, and the cartridge body 11, the screw tube 12, and the movable body 13 are removed from the container body 3.

Then, the cartridge cap 15 is removed from the cartridge body 11 of the new drawing material container cartridge 10, and the screw tube 12 and the cartridge body 11 of the new drawing material container cartridge 10 are inserted rearward into the inside of the inner tube 4. When the screw tube 12 and cartridge body 11 are inserted rearward inside the inner tube 4, the engaging portion 12*b* of the screw tube 12 engages with the second protrusions 5*c* of the outer tube 5, and the first locking portion 11*s* locks to the container body 3 in the axial direction D1. For example, the step 11*t* of the first locking portion 11*s* comes into contact with a front end of the inner tube 4. Accordingly, the drawing material container 1 can be ready for use.

The drawing material container 1 can be used by rotating the container body 3 relative to the cartridge body 11 in a state where the cap 2 is removed. When the container body 3 is rotated in one direction relative to the cartridge body 11, the screw tube 12 that rotates synchronously with the container body 3 (outer tube 5) rotates in the one direction relative to the cartridge body 11 and the movable body 13, and the screwing action between the female screw 12*k* and the male screw 13*m* is activated to move the movable body 13 forward with respect to the screw tube 12. When the movable body 13 moves forward with respect to the screw tube 12, the drawing material M held by the drawing material holding portion 13*b* of the movable body 13 is fed out from the opening 11*c* of the cartridge body 11, and the drawing material M is applied to a portion to be applied such as skin.

After the drawing material M is applied, when the container body 3 is rotated relative to the cartridge body 11 in an opposite direction to the one direction, the container body 3 and the screw tube 12 rotate relative to the cartridge body 11 and the movable body 13 in the opposite direction, and the screwing action between the female screw 12*k* and the male screw 13*m* is activated to move the movable body 13 rearward with respect to the screw tube 12. When the movable body 13 moves rearward with respect to the screw tube 12, the drawing material M is retracted into the opening 11*c*. Then, the cap 2 is mounted on the container body 3 (inner tube 4), and the use of the drawing material container 1 is completed.

Next, actions and effects of the drawing material container cartridge 10 according to the present embodiment will be described. As shown in FIGS. 2 and 8B, the drawing material container cartridge 10 includes the cartridge body 11 and the cartridge cap 15 that is mounted on the cartridge body 11. The cartridge body 11 includes the tubular portion 11*b* that accommodates the drawing material M, and the tubular portion 11*b* is inserted into the cartridge cap 15 along the axial direction D1. The cartridge body 11 is mounted in the container body 3 by being inserted into the container body 3. The cartridge body 11 includes the first locking portion 11*s*, and the first locking portion 11*s* locks to the container body 3 in the axial direction D1. The cartridge cap 15 includes the second locking portion 15*g*, and the second locking portion 15*g* locks to the first locking portion 11*s* of the cartridge body 11 in the axial direction D1. Therefore, the first locking portion 11*s* of the cartridge body 11 is a portion that locks to the container body 3, and is a portion to which the second locking portion 15*g* of the cartridge cap 15 locks. Therefore, the first locking portion 11*s* of the cartridge body 11 can be used in common as the portion that locks to the container body 3 and the portion to which the cartridge cap 15 locks.

Namely, since the portion that locks to the container body 3 and the portion to which the cartridge cap 15 locks are formed as the first locking portion 11*s*, the configuration of the cartridge body 11 can be simplified. By using the first locking portion 11*s* in common as the portion that locks to the container body 3 and the portion to which the cartridge cap 15 locks, the number of protrusions and recesses of the cartridge body 11 can be reduced, so that the aesthetic appearance of the cartridge body 11 can be improved.

In the present embodiment, the cartridge body 11 includes the insertion portion 11*q* that is inserted into the container body 3. The first locking portion 11*s* may be the step 11*t* that is increased in diameter from the insertion portion 11*q*, and the step 11*t* may come into contact with the container body 3 when the cartridge body 11 is mounted in the container body 3. In this case, the cartridge cap 15 locks to the step 11*t*, so that the cartridge cap 15 can be more reliably mounted on the cartridge body 11. By forming the step 11*t* as the first locking portion 11*s*, the configuration of the first locking portion 11*s* can be simplified, which contributes to further simplifying the configuration.

In the present embodiment, the tubular portion 11*b* has the inclined surface 11*r* inclined with respect to the axial direction D1 such that the tubular portion 11*b* is increased in diameter as the tubular portion 11*b* extends away from the opening 11*c* in the axial direction D1, the drawing material M being exposed through the opening 11*c*. In this case, the inclined surface 11*r* of the cartridge body 11 that is inserted into the cartridge cap 15 is reduced in diameter as the inclined surface 11*r* extends toward the opening 11*c*. Therefore, the insertion of the cartridge body 11 into the cartridge cap 15 can be easily performed.

In the present embodiment, the cartridge cap 15 includes the inner surface 15*b* extending along the axial direction D1; the bottom portion 15*c* located at the one end of the inner surface 15*b* in the axial direction D1; and the contact suppression portion 15*d* that is formed on the inner surface 15*b*, and that suppresses the contact of the tubular portion 11*b* with the bottom portion 15*c*. In this case, the contact suppression portion 15*d* formed on the inner surface 15*b* of the cartridge cap 15 suppresses the contact of the tubular portion 11*b*, which accommodates the drawing material M, with the bottom portion 15*c*. Therefore, the contact of the drawing material M with the inner surface of the cartridge cap 15 can be suppressed.

The drawing material container set according to the present disclosure includes the drawing material container cartridge 10 described above, and the container body 3 in which the cartridge body 11 of the drawing material container cartridge 10 is detachably mounted. For example, the drawing material container set is a drawing material container set in which the drawing material container cartridge 10 on which the cartridge cap 15 is mounted as a temporary cap, and the container body 3 constituting the drawing material container 1 when the cartridge body 11, the screw tube 12, and the movable body 13 are mounted in the container body 3 are packaged and sold as a single unit. In the drawing material container set, the cartridge body 11 of the drawing material container cartridge 10 is detachably attachable to the container body 3. Therefore, similarly to the drawing material container cartridge 10, the configuration can be simplified, and the aesthetic appearance can be improved.

The embodiment of the drawing material container cartridge and the drawing material container set according to the present disclosure has been described above. However, the drawing material container cartridge and the drawing material container set according to the present disclosure are not limited to the above-described embodiment, and may be modified as appropriate within the scope where the concept described in the claims is not changed. Namely, the shape, size, material, number, and disposition mode of each part of the drawing material container cartridge and the drawing material container set according to the present disclosure can be changed as appropriate within the scope of the concept.

For example, the drawing material container set may be a combination of the drawing material container cartridge 10 and the container body 3 in which the cartridge body 11, the screw tube 12, and the movable body 13 are not mounted, or may be a combination of the drawing material container cartridge 10 and the container body 3 (drawing material container 1) in which the cartridge body 11, the screw tube 12, and the movable body 13 are mounted.

In the above-described embodiment, the drawing material container cartridge 10 including the cartridge body 11 in which the first locking portion 11*s* is the step 11*t* has been described. However, the first locking portion may not be the step 11*t*, and may be, for example, a protrusion protruding in the radial direction, or a recess recessed in the radial direction. In such a manner, the shape of the first locking portion can be changed as appropriate. Similarly, the shape of the second locking portion of the cartridge cap can be changed as appropriate.

In the above-described embodiment, the drawing material container cartridge 10 that includes the screw tube 12 including the female screw 12*k* and the movable body 13 including the male screw 13*m*, and that has the function of feeding out the drawing material M by relative rotation between the screw tube 12 and the movable body 13 causing the activation of the screwing action between the female screw 12*k* and the male screw 13*m* has been described. However, the drawing material container cartridge may not include the screw tube 12 and the movable body 13. The drawing material container cartridge may not feed out the drawing material using relative rotation. The drawing material container cartridge may include a feed-out mechanism that is a mechanical push-out mechanism such as a knock type, instead of using relative rotation, and may push out the drawing material using the push-out mechanism, or may include a squeeze-type feed-out mechanism.

In the above-described embodiment, the drawing material container cartridge 10 including the drawing material M that is a cosmetic has been described. However, the drawing material may be something other than a cosmetic. For example, the drawing material may be a core material used in writing instruments such as crayons. In such a manner, the drawing material container cartridge and the drawing material container set according to the present disclosure can be applied to containers including not only cosmetics but also various drawing materials, such as writing instruments or stationery.

REFERENCE SIGNS LIST

1: drawing material container, 2: cap, 3: container body, 4: inner tube, 4*b*: insertion portion, 4*c*: exposed portion, 4*d*: slit, 4*f*: spring portion, 4*g*: engaging portion, 4*h*: first annular protrusion, 4*j*: second annular protrusion, 4*k*: protrusion, 5: outer tube, 5*b*: first protrusion, 5*c*: second protrusion, 5*d*: first annular recess, 5*f*: second annular recess, 10: drawing material container cartridge, 11: cartridge body, 11*b*: tubular portion, 11*c*: opening, 11*d*: front end, 11*f*: first extending portion, 11*g*: second extending portion, 11*h*: first protruding portion, 11*j*: second protruding portion, 11*k*: corner portion, 11*m*: one-side holding portion, 11*p*: tubular holding portion, 11*q*: insertion portion, 11*r*: inclined surface, 11*s*: first locking portion, 11*t*: step, 11*v*: recess, 11*w*: elastically deformable portion, 11*w*1: first slit, 11*w*2: second slit, 11*x*: hole portion, 11*y*: protrusion, 12: screw tube, 12*b*: engaging portion, 12*c*: insertion portion, 12*d*: protrusion, 12*f*: flange portion, 12*g*: elastically deformable portion, 12*g*1: first slit, 12*g*2: second slit, 12*g*3: protrusion, 12*h*: annular recess, 12*j*: annular protrusion, 12*k*: female screw, 13: movable body, 13*b*: drawing material holding portion, 13*c*: screw portion, 13*d*: base portion, 13*f*: grip portion, 13*g*: protrusion, 13*h*: arm portion, 13*j*: protruding portion, 13*k*: projection, 13*m*: male screw, 15: cartridge cap, 15*b*: inner surface, 15*c*: bottom portion, 15*d*: contact suppression portion, 15*f*: rib, 15*g*: second locking portion, 15*h*: annular recess, 15*j*: annular protrusion, 15*k*: opening, D1: axial direction, D2: major axis direction, D3: minor axis direction, L: axis, M: drawing material, M1: front end, M2: curved portion.

What is claimed is:

1. A drawing material container cartridge comprising:

a cartridge body including a tubular portion that accommodates a drawing material, and being configured to be detachably mounted in a container body by being inserted into the container body along an axial direction that is a direction in which an axis of the tubular portion extends; and a cartridge cap that is mounted on the cartridge body by inserting the tubular portion along the axial direction, wherein the cartridge body includes a first locking portion that locks to the container body in the axial direction when the cartridge body is mounted in the container body, and an insertion portion that is inserted into the container body, the first locking portion includes a step that is increased in diameter from the insertion portion, the step includes a flat back surface extending radially outward of the cartridge body and a corner between the flat back surface and an outer surface of the tubular portion extending toward a front from a radially outward end of the flat back surface, and the flat back surface of the step comes into contact with the container body when the cartridge body is mounted in the container body, the cartridge cap includes an inner surface, and a second locking portion that locks to the first locking portion in the axial direction when the cartridge cap is mounted on the cartridge body, the second locking portion includes a protrusion that protrudes from the inner surface of the cartridge cap, the second locking portion locks to the first locking portion by the protrusion being hooked onto the corner of the step, and the first locking portion of the cartridge body is a portion that abuts the container body and is a portion at which the second locking portion of the cartridge cap locks.

2. The drawing material container cartridge according to claim 1, wherein the tubular portion has an inclined surface inclined with respect to the axial direction such that the tubular portion is increased in diameter as the tubular portion extends away from an opening in the axial direction, the drawing material being exposed through the opening.

3. The drawing material container cartridge according to claim 1, wherein the inner surface of the cartridge cap extends along the axial direction, and the cartridge cap further includes a bottom portion located at one end of the inner surface in the axial direction, and a contact suppression portion that is formed on the inner surface, and that suppresses a contact of the tubular portion with the bottom portion.

4. The drawing material container cartridge according to claim 3, wherein the contact suppression portion includes a rib protruding from the inner surface toward the radial inside of the cartridge cap.

5. The drawing material container cartridge according to claim 4, wherein the tubular portion has an inclined surface inclined with respect to the axial direction such that the tubular portion widens as the tubular portion extends axially away from an opening through which the drawing material is exposed, and the rib faces the inclined surface in a state that the cartridge cap is attached to the cartridge body.

6. The drawing material container cartridge according to claim 5, wherein the rib extends in the axial direction from the bottom portion of the cartridge cap.

7. A drawing material container set comprising:

the drawing material container cartridge according to claim 1; and a container body in which the cartridge body of the drawing material container cartridge is configured to be detachably mounted.

8. The drawing material container cartridge according to claim 1, wherein the protrusion is an annular protrusion having an annular shape.

9. The drawing material container cartridge according to claim 8, wherein the cartridge cap has an opening through which the tubular portion is inserted along the axial direction, the second locking portion further includes an annular recess in the inner surface of the cartridge cap, and the annular protrusion is located between the annular recess and the opening.

* * * * *